United States Patent [19]

Lim

[11] Patent Number: 5,457,499
[45] Date of Patent: Oct. 10, 1995

[54] SOURCE ADAPTIVE TELEVISION SYSTEM

[75] Inventor: Jae S. Lim, Winchester, Mass.

[73] Assignee: Massachusetts Institute of Technology, Cambridge, Mass.

[21] Appl. No.: 117,984

[22] Filed: Sep. 8, 1993

Related U.S. Application Data

[63] Continuation of Ser. No. 957,255, Oct. 6, 1992, abandoned, which is a continuation of Ser. No. 459,289, Dec. 29, 1989, Pat. No. 5,187,575.

[51] Int. Cl.$^6$ .................................................. H04N 7/08
[52] U.S. Cl. .......................... 348/474; 348/460; 348/555; 348/558
[58] Field of Search .............................. 358/140, 141, 358/105, 11, 12, 142; 348/449, 460, 473, 474, 553, 554, 555, 478, 465, 558; H04N 7/01, 11/20, 7/087, 7/08, 7/00, 5/44, 5/445

[56] References Cited

U.S. PATENT DOCUMENTS

| | | | |
|---|---|---|---|
| 3,781,818 | 12/1973 | Pardoe et al. | 340/172.5 |
| 3,848,082 | 11/1974 | Summers | 348/460 |
| 3,912,872 | 10/1975 | Callens | 179/15 BA |
| 4,198,651 | 4/1980 | Barton et al. | 358/21 V |
| 4,611,225 | 9/1986 | Powers | 358/140 |
| 4,639,779 | 1/1987 | Greenberg | 358/142 |
| 4,641,188 | 2/1987 | Dischert | 358/140 |
| 4,679,091 | 7/1987 | Kikuchi et al. | 358/242 |
| 4,759,018 | 7/1988 | Buchner | 370/112 |
| 4,800,426 | 1/1989 | Glenn | 358/141 |
| 4,838,685 | 6/1989 | Martinez et al. | 352/85 |
| 4,860,098 | 8/1989 | Murphy | 358/139 |
| 4,881,125 | 11/1989 | Krause | 358/141 |
| 4,961,112 | 10/1990 | Sugimori et al. | 358/141 |
| 4,962,428 | 10/1990 | Tong et al. | 358/188 |
| 4,967,273 | 10/1990 | Greenberg | 358/142 |
| 5,070,404 | 12/1991 | Bullock et al. | 358/142 |
| 5,083,205 | 1/1992 | Arai | 358/140 |
| 5,132,793 | 1/1992 | Hirahata et al. | 358/140 |

FOREIGN PATENT DOCUMENTS 402992 12/1990 European Pat. Off. ........ H04N 7/087

OTHER PUBLICATIONS

Martinez et al., U.S. patent application No. 07/421,152.
Faroudja et al., "Improving NTSC to Achieve Near–RGB Performance", SMPTE Journal, pp. 750–761 (Aug. 1987).
Faroudja et al., "A Progress Report on Improved NTSC", SMPTE Journal, pp. 817–822 (Nov. 1989).
Lim, *Two Dimensional Signal and Image Processing*, Prentice Hall (1990).
Pratt, W. K., *Digital Image Processing*, John Wiley & Sons, Inc., pp. 591–735 (1978).
Schreiber, "Improved Television Systems: NTSC and Beyond", SMPTE Journal, vol. 66, No. 8 (Aug. 1987).
Schreiber, "Psychophysics and the Improvement of Television Image Quality", SMPTE Journal, vol. 93, No. 8 (Aug. 1984).
Schreiber et al., "Reliable EDTV/HDTV Transmission in Low–Quality Analog Channels", SMPTE Journal, pp. 496–503 (Jul. 1989).

*Primary Examiner*—James J. Groody
*Assistant Examiner*—Chris Grant
*Attorney, Agent, or Firm*—Fish & Richardson

[57] ABSTRACT

A television transmitter for transmitting a television signal representing a series of scenes, the series of scenes having a non-program-content characteristic. The transmitter includes a processor for processing the series of scenes so as to retain a non-program-content characteristic of the series of scenes, means for inserting identification information into the television signal, the identification information being indicative of the non-program-content characteristic retained in the processed series of scenes, and a signal transmitter for broadcasting the television signal. Also disclosed is an advanced video system for receiving, processing and displaying received source material having non-program-content characteristics. The system includes a classifier unit for identifying different classes of received source material based upon the non-program-content characteristics of the received source material, and an adaptive processor unit for treating each class of received source material according to its non-program content characteristics.

8 Claims, 6 Drawing Sheets

SOURCE ADAPTIVE TELEVISION SYSTEM

This invention was made with government support under Contract. No. 8714969-MIP by National Science Foundation. The government has certain rights in the invention.

This is a continuation of application Ser. No. 07/957,255, filed Oct. 6, 1992, now abandoned, which is a continuation of application Ser. No. 07/459,289, filed Dec. 29, 1989, now issued U.S. Pat. No. 5,187,575.

BACKGROUND OF THE INVENTION

This invention relates to new methods and apparatus for advanced video systems, including advanced television systems.

The original monochrome television broadcasting standard for the United States was set in 1941 by the National Television Systems Committee (NTSC). The color television standard was established in 1953 by the NTSC in a manner compatible with the monochrome standard. This NTSC standard calls for 525 lines interlaced at 30 frames/second, with each frame represented by two interlaced fields at a rate of 60 fields/second, and an overall channel bandwidth of 6 MHz. More than 15% of the transmission time is reserved for blanking (retrace time) to allow the display to be scanned in synchronism with the camera.

In the NTSC system, each frame is scanned or decomposed into two related fields, one field is raster scanned along the odd number lines and then the second field is scanned along the even number lines. This field information is broadcast and the receiver displays the fields in an interlaced manner.

Various types of program material can be broadcast under the NTSC standard. Conventional moving picture films are a common source of program material. For viewing these films in theatres, 24 film frames (scenes) are used in one second; to avoid flicker, however, each film frame is shown twice. It is therefore necessary to convert 24 frames per second film to the NTSC video rate of 60 fields/second, such as by the known 2:3 pull-down method. In this method, one film frame is converted to two fields (one odd field and one even field) and the next (second) film frame is converted to three fields (one odd field, one even field, and one odd field). The next (third) film frame is converted to two fields (one even field and one odd field), and the next (fourth) film frame is converted to three fields (one even field, one odd field, and one even field). The process continues in this manner, creating 6 sets of 10 fields for every set of 24 film frames, thus converting the film into the 60 fields per second rate required by NTSC. SECAM and PAL, two other standards used in various parts of the world including Europe, operate at 50 fields per second and normally employ a known 24/50 conversion technique for converting film to video.

In the case of program material not recorded on film, the conventional camera scans the odd field and then the even field 30 times per second, thus creating the 60 fields per second rate required by NTSC; SECAM and PAL scan the two fields at 25 times per second, thus creating 50 fields per second.

SUMMARY OF THE INVENTION

Different types of video program source material, such as film source material or video camera source material, each having distinctly different characteristics, are used for broadcasting and display. In the present invention, we describe an advanced receiver that can identify these different types of program source materials, and their different characteristics are exploited to improve the video quality. The advanced receiver can be used with a conventional transmitter or with a more cooperative new transmitter.

One aspect of the present invention provides a new source-distinguishing video system. The receiver design is new. The transmitter design may be conventional or non-conventional, depending upon the implementation. The particular convention of interest is merely a matter of choice. If the transmitter design is conventional, then the over-all system will be compatible with conventional receivers. If the transmitter design is new, then the over-all system may be receiver-compatible (i.e., conventional) depending upon the changes made in the transmitter.

A new advanced receiver includes a discriminating unit for identifying different classes of received source material based upon (1) non-program-content characteristics of the received source material or of the original source material upon which the received source material is based or (2) any standard of conversion that the original source material may have been subjected to prior to reception. Each class is treated according to its non-program-content characteristics. The receiver further includes an adaptive processor unit for enabling treating each class according to its non-program-content characteristics, whereby a display coupled to the output of the processor apparatus will have improved video. Display resolution thus can be improved by increasing the spatial resolution of each display frame of video source material without addition of substantial amounts of undesirable artifacts, such as motion blur. The adaptive processor may include a classifier unit for identifying the specific class of the received source material. Non-program-content characteristics include such items as frame rate, spatial resolution, scanning format (such as interlaced or progressive), etc., as distinguished from the program type, such as soap opera, sitcom, action or non-action, etc.

A new advanced transmitter (FIG. 10) includes a video processor 200 configured such that video scene source material such as from a camera or some intermediary is stored in a memory, 202 is processed by the video processor so as to retain a portion or all of the specific non-program-content characteristics of the scene source material, and can be broadcast by a signal transmitter 204. Now the received scene material can be evaluated based upon the class of the retained specific characteristics.

In another aspect of the invention, an advanced receiver is provided with a system to enable higher resolution display of a scene or one of a series of video scenes, with each scene generally represented by at least one set of a plurality of sets of video information. The advanced receiver includes a device for enabling displaying a given scene or series of video scenes by forming respectively combined sets of said plurality of sets of video information which are attributed to a respective scene, whereby the scene or series of scenes can be displayed with higher resolution than if displayed without the system.

Embodiments of this aspect may include an attributor device for enabling attributing a respective set of the plurality of sets of video information to a respective one of the video scenes which they represent and/or a combiner device for enabling combining any set of the plurality of sets of video information which are attributed to the same scene to enable forming respectively combined sets.

The attributor device or combiner device may include an interpolator device operable, where only one set of video information is attributed to a particular scene, for generating a set of video information with the only one set of video information, and for presenting this combined information to the display device as combined sets of video information attributed to that particular scene.

Each set of video information may include at least one field of scan lines and the attributing device may attribute every field to a different scene for non-film video.

Each set of video information may include at least one field of scan lines and the attributor device may determine the beginning of a new scene for film video by exploiting the fact that N fields of a given set of M fields are identical periodically, where preferably N=2 fields, M=3 fields, and the period=every 5 fields, for NTSC video.

The attributor device may be configured to determine the beginning of a new scene or frame based upon identification information. The identification information may be provided in unused portions of vertical or horizontal blanking intervals within the scene or series of scenes.

Each set of video information may include at least one field of scan lines and the identification information may include several bits per field to indicate whether the scene or series is from film or non-film source, whether the data is from an odd or even field, and/or which field or fields are from a given scene. The display device may include a display terminal. The receiver may further include a controller for coordinating the actions of the attributor device, the combiner device, the interpolator device, and the display device. At least one memory may be associated with any of the devices.

In another aspect of the invention, an advanced transmitter system includes a scene memory for storing video information from a video source and a processor, the processor generating an even and an odd field from the contents of the scene memory without motion artifact between the fields, and for providing these fields for transmission as one scene.

In another aspect of the invention, a method for displaying a given video scene or a series of video scenes, the scene or scenes each generally represented by at least one set of video information, includes the step of: enabling displaying a scene or series of video scenes with respectively combined sets of video information being attributed to a respective scene, or series of scenes, whereby the scene or series of scenes can be displayed with higher resolution.

An embodiment of this aspect may include the steps of enabling attributing received sets of video information to the video scene which they represent and/or enabling combining any of the sets of video information which are attributed to the same scene for forming the combined sets.

In another aspect of the invention, a method for improving picture quality of a video signal, which includes a sequence of fields each of a given number of scan lines, includes the steps of identifying related ones of the plurality of fields and combining adjacent related fields into a single frame, whereby the single frame contains a greater number of scan lines than any of the fields alone contains.

In another aspect of the invention, an apparatus for improving picture quality of a video signal includes an arrangement for identifying a plurality of related fields of said sequence and for combining adjacent ones of the fields into a respective frame, whereby said respective frame contains a greater number of scan lines than any of the fields alone contains.

In another aspect of the invention, the present method and/or apparatus may be incorporated into an advanced transmitter and/or an advanced receiver to yield higher resolution displays for continuous, stop action or freeze frame uses.

The present invention is operable with various forms of displays, including, for example, CRT, rear-projection, laser, and hard copy.

Other advantages and features will become apparent from the following description of the preferred embodiment and from the claims.

DESCRIPTION OF THE PREFERRED EMBODIMENTS

The present invention is based on the recognition that different types of video source material e.g., high-resolution film, low-resolution film, video from a video camera, etc.) can be identified at the receiver, and different characteristics associated with the different types of program source material can be exploited to improve the video quality. This has a broad set of applications. For clarity and brevity, we illustrate the practice of the invention using a few application examples with emphasis on improving the NTSC system in a receiver-compatible manner. The invention applies to any assigned broadcast convention, including NTSC, SECAM or PAL, for example, and is applicable to EDTV (extended definition TV) and HDTV (high definition TV) formats. NTSC is primarily discussed by way of example and not by way of limitation.

Figure 1:
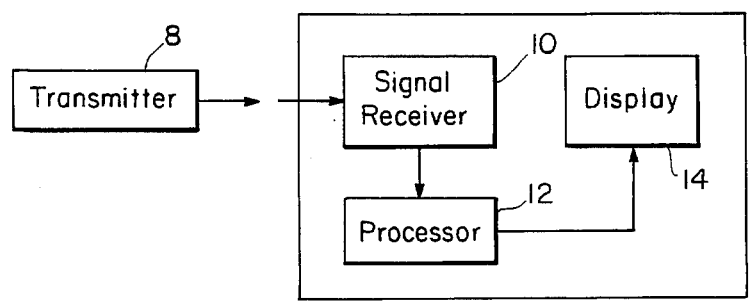
FIG. 1 is a block diagram of a generalized system of a transmitter and receiver.

The present source-distinguishing television system is shown in FIG. 1, where transmitter 8 may be either conventional or non-conventional. Advanced receiver 9 is new. If the transmitter design is conventional, then the over-all system will be receiver-compatible with the transmission convention. If the transmitter design is new, then the over-all system may or may not be receiver-compatible depending upon the changes made in the new transmitter. In any event, the transmitter will transmit video information representative of film or non-film source material according to the chosen format.

Figure 9:
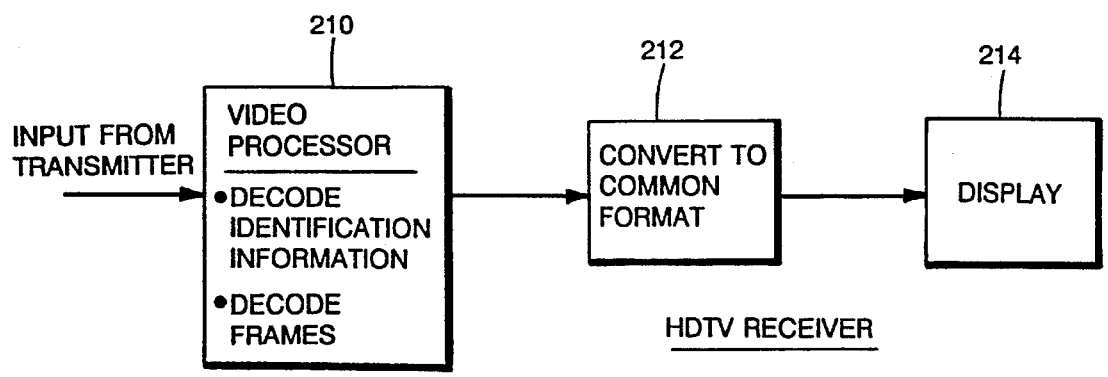
FIGS. 9 and 10 show HDTB transmitter and receiver embodiments of the invention.
Figure 10:
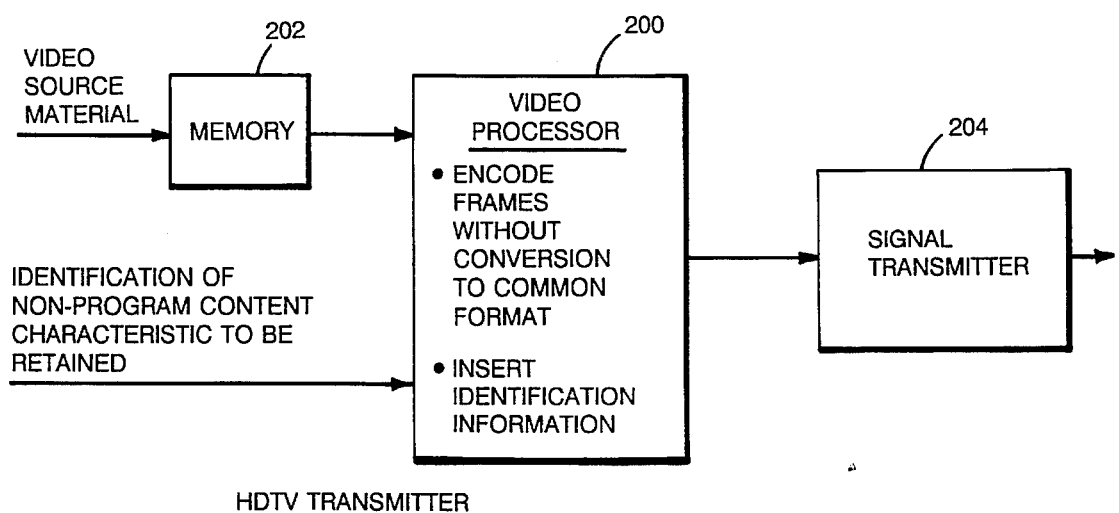

The new receiver 9 includes a signal receiver 10, a processor 12 and a display 14. The processor is capable of identifying different classes of received source material. Each class is treated according to its specific non-programcontent characteristics. As a result, an improved video display, including higher resolution, can be obtained. FIGS 9 and 10 show HDTV transmitter and receiver embodiments of the invention. Display resolution can be improved by increasing the spatial resolution of each display frame of source material without addition of substantial amounts of undesirable artifacts, such as motion blur.

Figure 2:
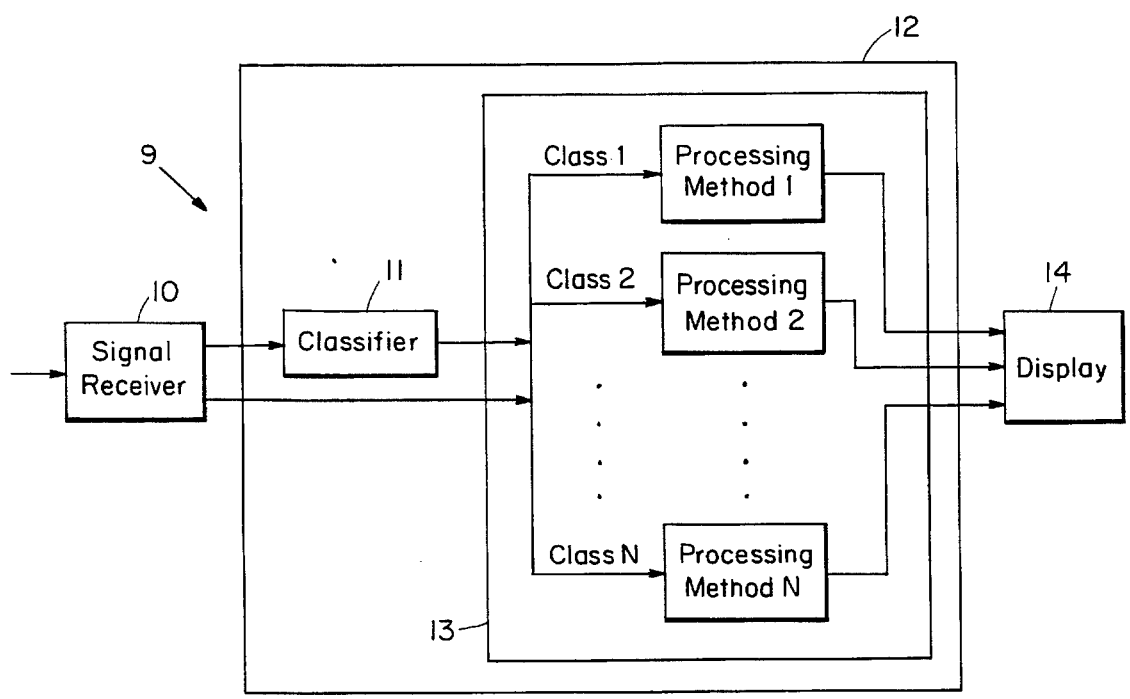
FIG. 2 is a block diagram of the processor section of an advanced receiver in practice of the invention.

As shown in FIG. 2, a preferred embodiment of processor 12 includes a classifier 11 which receives a video signal from signal receiver 10. This video signal is derived from the source material. Classifier 11 identifies the source material as one of several classes of source material. An identification signal from classifier 11 and the signal from signal receiver 10 are applied to adaptive processor unit 13.

Adaptive processor unit 13 includes intelligence to apply an appropriate processing method (such as of the selection of methods 1-N) suitable to the classification given to the source material by classifier 11. The display 14 is driven accordingly.

The foregoing arrangement has many specific applications. Illustrative embodiments are set forth below.

According to the NTSC standard, the scenes are broadcast and displayed as alternating odd and even fields of video information. Each field is displayed in its own distinct 1/60th of a second time interval. If an odd field and an even field have been derived from the same scene, then obtaining a complete frame by combining the two fields and then displaying the complete frame during a 1/60th of a second time interval will significantly improve the video quality due to the higher spatial resolution.

When video information is derived from a film source, the video information includes at least one pair of an odd field and an even field obtained from each film frame (scene). In this case, it is possible to faithfully reconstruct each complete film frame by combining the corresponding odd field and even field. When video information is derived from a video camera based on the NTSC standard, each field is written in its own distinct 1/60th of a second time interval and therefore each field contains unique information about the scene (e.g. based upon movement) during that time interval. As a result, the two fields cannot in general be combined without introducing motion blur. In this case, we can attempt to create a frame from each field through signal processing. Alternatively, we can modify the transmitter (typically the video camera) so that an odd field and even field are generated from the same scene with little motion artifact.

In practice of one aspect of the present invention, improved resolution is achieved by first identifying the type of source from which received video information originated and then processing the video information according to its characteristics using such methods as described above.

Figure 3:
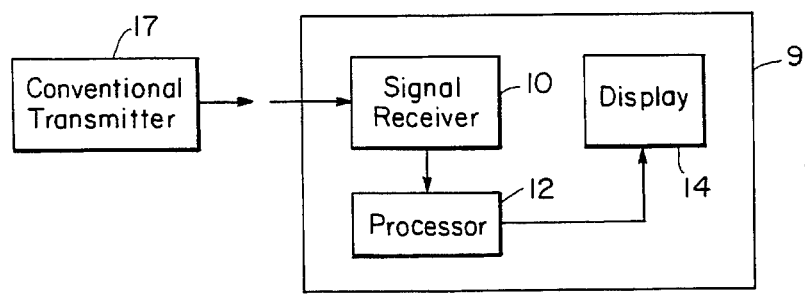
FIG. 3 is a block diagram of a conventional transmitter and an advanced receiver system of the invention.

In one embodiment, shown in FIG. 3, video is broadcast in conventional alternating field format by a conventional transmitter 17. At the signal receiver 10 of advanced receiver system 9, the odd and even field information is received in a conventional manner. This information is processed by processor 12 and then is delivered for viewing at display 14.

Figure 4:
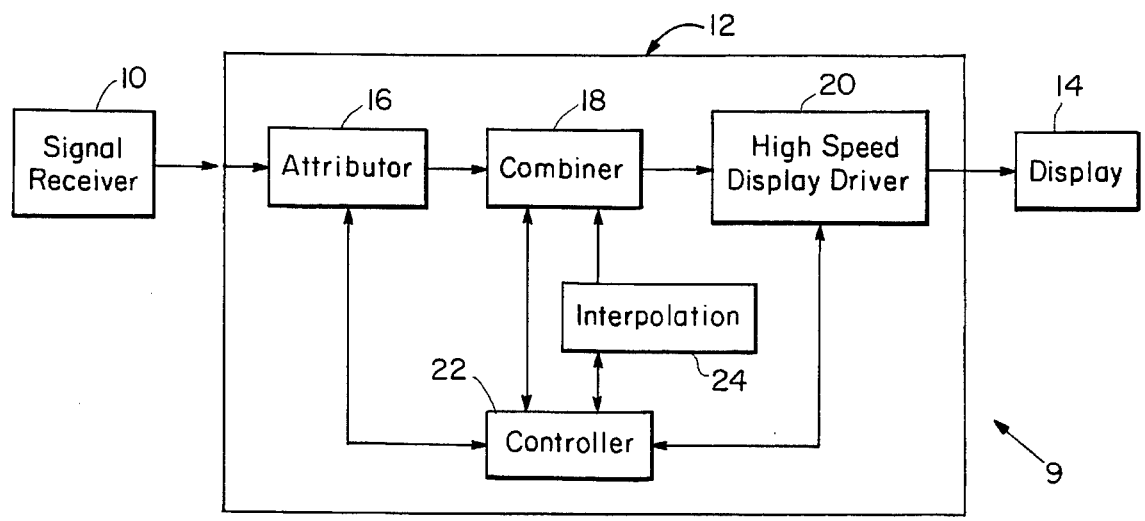
FIG. 4 is a block diagram of the advanced receiver of FIG. 3 showing the processor in greater detail.

More particularly, as shown in FIG. 4, processor 12 includes an attributor device 16 for attributing received sets of field information to the original scene which they represent (i.e., from which they were derived). Also provided is a combiner device 18 for combining any of the fields which are attributed to the same scene into a single combination frame. The spatial resolution of the combination frame can be improved further by an interpolation device 24. Finally a high speed display driver 20 is provided to drive display 14 for displaying each combination frame assembled by device 18. Device 20 preferably includes a circuit to enable progressive scanning at display 14 at rates well in excess of the rate required for a conventional display so that the additional information supplied by the present invention can be displayed within the conventional NTSC time frame. The functions of the attributor device 16, combiner device 18, interpolation device 24 and display driver 20 are under the influence of a controller 22. The attributor and combiner are provided or associated with sufficient memory to facilitate the present invention, as more particularly set forth below.

Under NTSC standards, signal receiver 10 delivers a sequential stream of odd and even field information for writing at the display. In a first 1/60th of a second the odd field is written followed by the even field in the next 1/60th of a second. In the present invention each combined frame (both odd and even fields combined) is displayed within one 1/60th of a second.

It should be noted that the invention disclosed above can be used for the design of a HDTV system. In known HDTV design proposals, both the film source and non-film source are converted to a common format at the transmitter and the same coding method is used to code them, as in conventional methods. This method does not allow the utilization of the knowledge that a film source is in general quite different from a non-film source in such characteristics as frame rate. In a new HDTV design using this invention, the film source and non-film source may be distinguished throughout the transmitter (FIG. 10) and different coding methods may be used to code them. Conversion to a common display format, (at 212, FIG. 9) if desired, can be carried out at the receiver to use a simple display 214. This method allows us to use film and non-film-specific coding methods.

The present invention provides a high resolution display in an advanced television receiver, and provides remarkably clear video from broadcast based on both film and non-film sources. This benefit is obtained regardless of the broadcasting standard employed. Three illustrative advanced receiver cases are set forth below regarding film source (conventional transmission), non-film source (conventional transmission) and non-film source (non-conventional transmission).

Film: Conventional Transmission, Advanced Receiver

It is noted that in the known 2:3 pull-down method for broadcast of conventional 24 frames per second film source material, each set of two or three fields attributed to a given film frame (scene) will not contain any motion within that set. This is based upon the fact that the identical film frame is used to generate each of the associated fields. Hence, we can exploit the fact that one film frame is converted to two fields and the next film frame is converted to three fields such that within each set of two or three video fields there is no motion.

The present invention is based in part on the recognition that, under various conventions and various conversion methods, a set of associated fields may be derived from an identical film scene. This recognition is employed along with the advantages of high speed display driver circuitry to reconstruct a frame with both odd and even field information and then to write the entire reconstructed frame within a time frame compatible with a given convention, such as 1/60th of a second compatible with NTSC. This substantially increases the amount of information displayed in any given time interval, since, for example, conventional NTSC provides for only a single field to be written in any 1/60th of a second.

Figure 5:
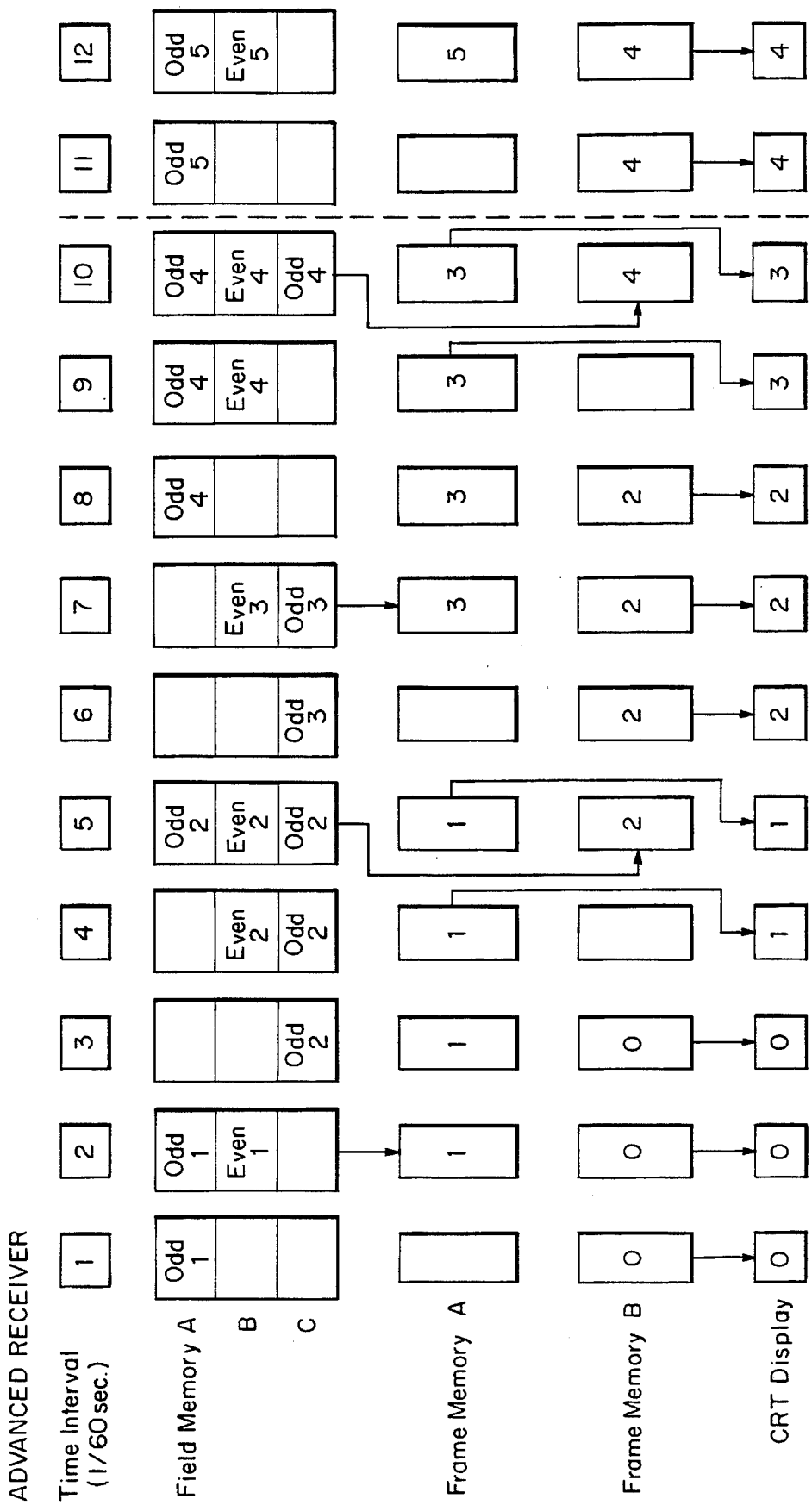
FIG. 5 is a timing diagram for film video material in practice of the invention.

The operation of an exemplary embodiment of an advanced receiver in practice of the present invention is shown in FIG. 5, for use with video based upon a film segment having film scenes (frames) 0–12. Twelve time intervals are shown, each one 1/60th of a second in duration. In the first time interval the information of an odd field is stored in field memory A of attributor device 16. In the same time interval field memories B and C contain information no longer needed and are left blank. Also, frame memory A of combiner 18 contains information no longer needed and is left blank and frame memory B of combiner 18 contains the film frame information from a prior time interval (designated as film scene "0" in frame memory B for intervals 1, 2 and 3). Also in interval 1, the contents of frame memory B are written by the high speed display driver 20 into display 14 so as to enable viewing of film scene "0".

Interval 2 begins at the completion of interval 1. In interval 2 the even field information for film scene "1" is written into field memory B of attributor 16. The odd field information in memory A remains in its assigned memory. Within this time interval, as the odd and even field information of film scene "1" becomes available, both the even and odd field information from the field memories is written into frame memory A represented as film scene "1". If additional interpolation by the interpolator device 24 is desirable, this interpolation can be carried out during this time interval.

During interval 3 odd field information from film scene "2" is written into field memory C of attributor 16. No change is made to the frame memories and the same display appears. In interval 4, the even field for the second film scene is written into field memory B and now the frame memory A information containing the combined odd and even fields of film scene "1" is written into the display by high speed display driver 20. This frame is written in 1/60th of a second.

Film scene "1" is again written on the display during interval 5. At the same time the third field for film scene "2" is written in field memory A and the contents are combined and written as film scene "2" in frame memory B. In time intervals 6, 7 and 8, the contents of frame memory B are written on the display so that film scene "2" is viewed for 3/60ths of a second. In time intervals 9 and 10, film scene "3" is written on the display. In this manner the alternating 3,2 3,2 3,2 conversion pattern of the 2:3 pull-down method is maintained at the display.

It will now be understood that with the conventional 2:3 pull-down method, in an NTSC conventional receiver, each time interval contains only the field information from a single film scene. In the present advanced receiver, both even and odd field information of the film scene is written within a single time interval. This provides twice the amount of information for a given time interval, thus yielding greater resolution at the display without motion blur.

The foregoing implementation includes three field memories, where a single field memory has the capacity to store the contents of one field. Generally, for film, the field memories A, B, C may be filled in the following order: A B C B A C B A B C for every ten time intervals. This order can be changed, but one advantage is that the most recent field information is not erased during the next time interval.

When three fields are combined to construct a combined film frame such as in time intervals 5 and 10, one method is to discard one of the redundant fields. In this method, then only two field memories are required. However, if the redundant fields are combined, by averaging for example, then it is convenient to have three field memories.

The current implementation requires two frame memories. Each frame memory should have the capacity of storing two fields. If further processing, such as line/column doubling is performed, then each frame memory should be able to store the enlarged frame information. Various techniques are known for line/column doubling such as disclosed in Martinez, Lim patent application, "Improving Television Pictures", U.S. Ser. No. 07/421,152, filed Oct. 13, 1989, assigned to the same assignee, the contents of which is incorporated herein by reference. Line/column doubling is an example of the functions which may be performed by interpolation device 24.

It should be noted that the implementation in FIG. 5 is one example of implementing an aspect of the invention and may not be the most efficient in resource utilization. In one possible case, if data is moved from the field memories to a frame memory at the same time as moving data from that frame memory to the display, then only one frame memory will be needed. For example, in time interval 5, as the data in frame memory A is moved to the display, then the new data from field memories can be used to fill frame memory A in that portion of frame memory A which has already been written to the display and is no longer required. As the last contents of frame memory A from the prior scene is written into the display, then the last of the field information from the field memories can be written into memory A. It will be appreciated, however, that where only a single frame memory is utilized, that field information will be written into the frame memory only during the last interval during which the former frame information is required to be displayed. This requires some modification in the system operation described in FIG. 5. For example, in time interval 7 we cannot fill frame memory A with film scene "3" information. Instead, this has to be done in time interval 8. It is further noted that the fields which are combined into a given frame will not have motion between themselves, therefore enabling their combination into a single frame without blurring and thus beneficially resulting in higher resolution.

It should be emphasized that one aspect of the invention relies on the recognition that we can identify the fields derived from a specific film frame and these fields can be combined without artifacts such as from motion. The discussion above illustrates the basic idea, and those skilled in the art can now develop variations of the invention in the foregoing and other applications. As an example, a display rate of 60 Hz was assumed in the above embodiment. It is appreciated that other display rates can be accommodated. For a display with 72 Hz rate, for example, each combined frame can be repeated three times.

As another example, in the above implementation, we have assumed receiver compatibility and have also assumed that the transmitter remains essentially the same as a conventional transmitter. As a result, one out of every two film frames is converted to two odd fields and one even field, or one odd field and two even fields. The transmission of the same two odd fields or the same two even fields wastes bandwidth. In applications such as in design of a high definition television (HDTV) system, receiver compatibility may not be necessary and the transmitter may be substantially modified. In these applications, we can represent the film frames in some bandwidth-efficient domain such as Discrete Cosine Transform (DCT) domain, transmit them, identify the information that contributes to each film frame at the receiver, (at 210, FIG. 9) reconstruct the film frames, and display them at a specified display rate (at 212, 214, FIG. 9) using such methods as the 2:3 pull-down method in the case of display with 60 Hz rate.

Non-Film: Conventional Transmitter, Advanced Receiver

The present invention also provides an advanced television receiver for conventional non-film source material. Conventional non-film source material contains a stream of 60 alternating odd/even fields per second video, each odd or even field representing a scene. Where the subject matter in a sequence of scenes includes motion, then each derived field (whether odd or even) will contain information specific to a scene, and will be understood to be a separate and distinct scene.

Figure 6:
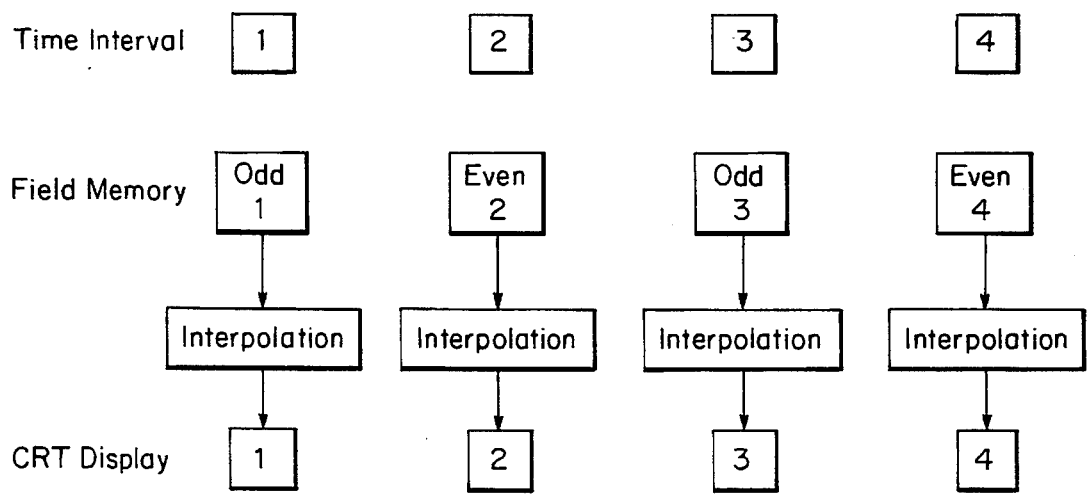
FIG. 6 is a timing diagram for non-film video material in practice of the invention.

This embodiment of the invention is described with respect to FIG. 6, where 1/60th of a second time intervals 1, 2, 3 and 4 are shown. In the first time interval an odd field is received and stored in a field memory. Now an interpolation device such as interpolation device 24 in FIG. 2 interpolates missing field lines from the odd field information in the field memory, and this combined odd field plus interpolated field information is written by high speed display driver 20 into display 14 so as to display scene "1" with higher resolution. The scene frame can be further interpolated by known line/column doubling methods such as described above. Since present processor technology can provide the above interpolation function in a short period of time relative to 1/60th of a second, this process can be performed essentially without delay and without additional memory requirements. Alternatively, slower processor technology may be employed, but thus requiring additional buffer memory.

As a result of this process, frame 1 is projected only based on information from the odd field. Frame 2 is projected only based on information from the even field, and so on. Hence, each frame which is projected only has information based on a single field, and therefore, no motion artifact as would be obtained by combining differing fields will be projected. Hence, in this embodiment, there is no unwanted motion artifact while a greater resolution per frame is achieved.

Non-Film: Advanced Transmitter, Advanced Receiver

Figure 7:
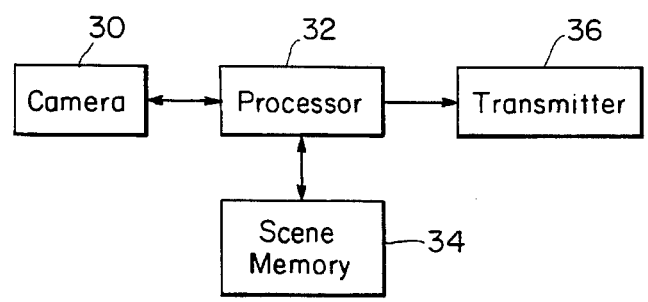
FIG. 7 is a block diagram of an advanced transmitter of the invention.

In yet another embodiment of the present invention, a new 2:2 pull-down method is employed at the transmitter. A scene source is progressively scanned at 30 scenes per second rate, with each scene preferably scanned in a sufficiently short period of time so that 30 essentially stationary scenes are captured. Now 2:2 pull-down conversion is performed where from the first scene an odd field is generated in a first 1/60th of a second interval and an even field is generated in a second 1/60th of a second interval From scene "2" an odd field is generated in the third 1/60th of a second interval and an even field in the fourth 1/60th of a second interval. This process repeats continuously. Because one scene becomes two NTSC fields, then 30 scenes per second become 60 NTSC fields per second. As shown in FIG. 7, camera 38 feeds 30 scenes per second source information to processor 32 which records each scene in a scene memory 34. The processor then uses the information in the scene memory to generate the odd field and even field from the same scene, therefore with little unwanted motion artifact. This material is then delivered to the transmitter for broadcast.

An advanced television receiver for cooperation with the advanced transmitter system of FIG. 7 may be configured according to the system of FIG. 4. The operation of this enhanced receiver will now be described with respect to FIG. 8. The 30 scenes per second video information at 60 fields per second are broadcast and received at this rate. In the first interval, again in 1/60th of a second, field memory A stores the odd field information for the first scene. The prior scene "0" is represented in frame memory B, which information is shown at the display. In the second interval, the same scene information is displayed, but now the even field information is stored in field memory B. During this interval, frame memory A can be loaded with the combined fields representing scene "1". Now in the third interval the frame from scene "1" is displayed from memory A while the new odd field information for scene "2" is stored in field memory A. In interval 4 the even field information for scene "2" is stored in field memory B and is combined and stored in frame memory B while the frame information for scene "1" from frame memory A is written for a last time on the display. Now in the next two intervals scene "2" is written on the display as the odd and even fields of the third scene are collected.

The implementation shown requires two frame memories, each frame memory having the capacity of storing two fields. If an interpolation method such as line/doubling is performed, then each frame memory should be able to store the enlarged frame data.

Figure 8:
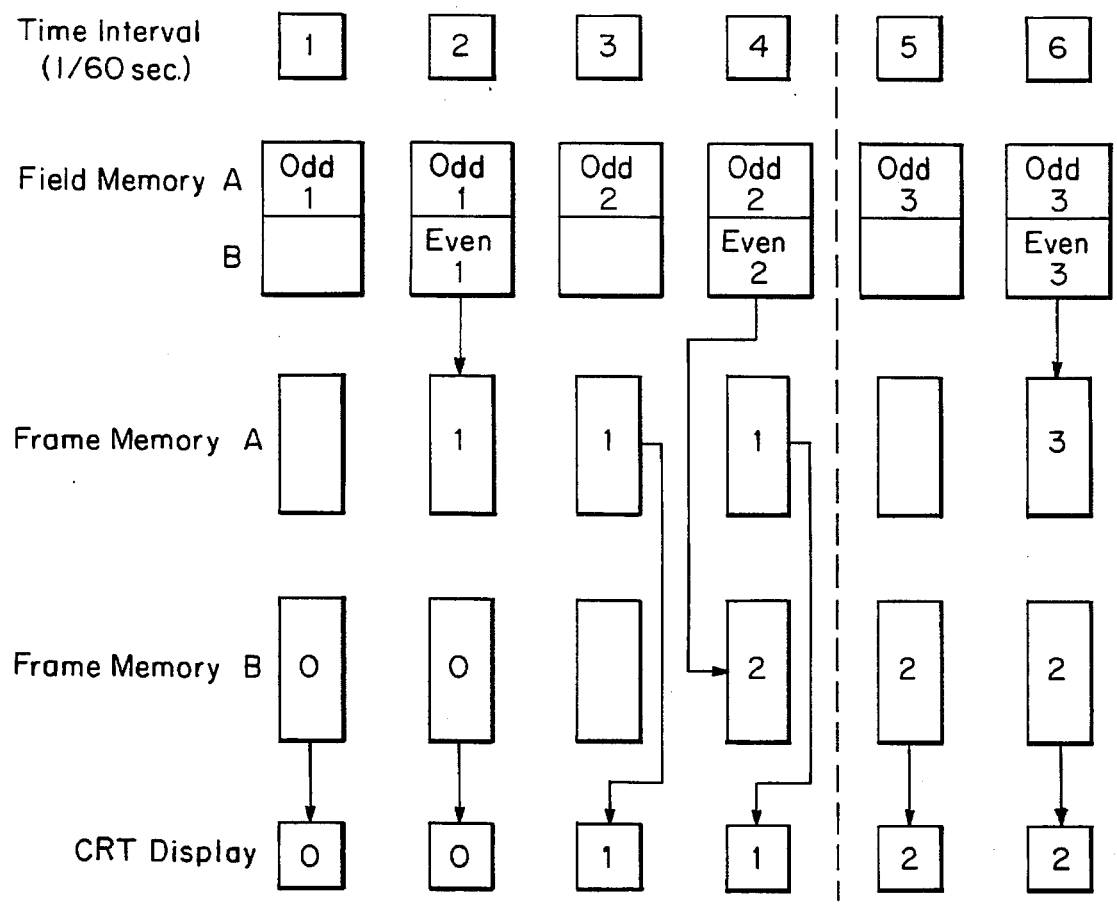
FIG. 8 is a timing diagram for non-film video material at the advanced receiver in a system incorporating an advanced transmitter and advanced receiver in practice of the invention.

It should be noted that the implementation in FIG. 8 is one example of implementing an aspect of the invention and may not be the most efficient in resource utilization. For example, if moving data from field memories to a frame memory can be done at the same time as moving the data from the same memory to the display, then two frame memories will not be needed. Hence, in time interval 4, as the data in frame memory A is moved to the display, the new data from field memories can fill frame memory A in the areas already written out to the display. Frame memory B therefore would not be required.

The foregoing receiver improvements, whether for film or non-film source material, may be designed into a single advanced receiver. To determine whether or not the video is from a film, the receiver may be provided with a detection system that exploits the fact that two fields (of a given set of three), are identical once every five fields, which is consistent with the 2:3 pull-down method. Alternatively, identification information can be inserted at the transmitter, such as in the currently unused portions of the vertical or horizontal blanking intervals. For example, a few bits per field can be used to indicate not only if the broadcast is from film, but also whether the data is from an odd or even field and which two or three fields are from the same film frame. This information would simplify the circuitry required at the receiver.

Having made the foregoing disclosure, it will now be possible for those skilled in the art to provide variations on the theme of the present invention. Nevertheless, these and other embodiments as set forth above and in the following claims are within the scope and spirit of the present invention.

What is claimed is:

1. A television transmitter for transmitting a television signal, the signal comprising a series of frames, the series of frames having a non-program-content characteristic, the transmitter comprising:

a processor for processing the series of frames so as to retain a non-program-content characteristic of the series of frames in a television signal;

means for inserting identification information into the television signal, the identification information being indicative of the non-program-content characteristic retained in the processed series of frames; and a signal transmitter for broadcasting a signal representing the processed series of frames, wherein the non-program-content characteristic is frame rate.

2. The television transmitter of claim 1 wherein the series of frames comprises a series of frames from a film source and a series of frames from a non-film source, the frame rate of the film source is different from the frame rate of the non-film source, the processor includes means for processing the series of frames from the film source and the series of frames from the non-film source so as to retain the difference in frame rate.

3. A television transmitter for transmitting a television signal, the signal comprising a series of frames, the series of frames having a non-program-content characteristic, the transmitter comprising:

a processor for processing the series of frames so as to retain a non-program-content characteristic of the series of frames in a television signal;

means for inserting identification information into the television signal, the identification information being indicative of the non-program-content characteristic retained in the processed series of frames; and a signal transmitter for broadcasting a signal representing the processed series of frames, wherein the non-program-content characteristic is spatial resolution.

4. A television transmitter for transmitting a television signal, the signal comprising a series of frames, the series of frames having a non-program-content characteristic, the transmitter comprising:

a processor for processing the series of frames so as to retain a non-program-content characteristic of the series of frames in a television signal;

means for inserting identification information into the television signal, the identification information being indicative of the non-program-content characteristic retained in the processed series of frames; and a signal transmitter for broadcasting a signal representing the processed series of frames, wherein the non-program-content characteristic is scanning format (such as interlaced or progressive).

5. A method of transmitting a television signal, the signal comprising a series of frames, the series of frames having a non-program-content characteristic, the method comprising the steps of:

processing the series of frames so as to retain a non-program-content characteristic of the series of frames in the television signal;

inserting identification information into the television signal, the indentification information being indicative of the non-program-content characteristic retained in the processed series of frames; and broadcasting the signal representing the processed series of frames, wherein the non-program-content characteristic is frame rate, and the broadcast signal retains the same frame rate as the series of frames prior to said processing.

6. The method of transmitting of claim 5 wherein the series of frames comprises a series of frames from a film source and a series of frames from a non-film source, the frame rate of the film source is different from the frame rate of the non-film source, the processing step comprises processing the series of frames from the film source and the series of frames from the non-film source so as to retain the difference in frame rate.

7. A method of transmitting a television signal, the signal comprising a series of frames, the series of frames having a non-program-content characteristic, the method comprising the steps of:

processing the series of frames so as to retain a non-program-content characteristic of the series of frames in the television signal;

inserting identification information into the television signal, the indentification information being indicative of the non-program-content characteristic retained in the processed series of frames; and broadcasting the signal representing the processed series of frames, wherein the non-program-content characteristic is spatial resolution.

8. A method of transmitting a television signal, the signal comprising a series of frames, the series of frames having a non-program-content characteristic, the method comprising the steps of:

processing the series of frames so as to retain a non-program-content characteristic of the series of frames in the television signal;

inserting identification information into the television signal, the indentification information being indicative of the non-program-content characteristic retained in the processed series of frames; and broadcasting the signal representing the processed series of frames, wherein the non-program-content characteristic is scanning format (such as interlaced or progressive).

\* \* \* \* \*

UNITED STATES PATENT AND TRADEMARK OFFICE
CERTIFICATE OF CORRECTION

PATENT NO.   : 5,457,499

DATED        : October 10, 1995

INVENTOR(S)  : Jae S. Lim

It is certified that error appears in the above-identified patent and that said Letters Patent is hereby corrected as shown below:

Cover page, under [56] References Cited, OTHER PUBLICATIONS, the first "Schreiber" reference, "vol." should be
--Vol.--.

Cover page, under [56] References Cited, OTHER PUBLICATIONS, the second "Schreiber" reference, "vol" should be
--Vol.--.

Col. 1, line 3, the first paragraph ("This invention was made...) should be moved to line 10, before "BACKGROUND OF THE INVENTION".

Col. 2, line 2, "materials" should be --material--.

Col. 2, line 41, after "memory", delete ","; after "202", insert --,--.

Col. 4, line 35, "HDTB" should be --HDTV--.

UNITED STATES PATENT AND TRADEMARK OFFICE
CERTIFICATE OF CORRECTION

PATENT NO.   : 5,457,499
DATED        : October 10, 1995
INVENTOR(S)  : Jae S. Lim It is certified that error appears in the above-identified patent and that said Letters Patent is hereby corrected as shown below:

Col. 4, line 38, before "e.g.", insert --(--.

Col. 6, lines 30-31, after "format", delete ","; after "(at 212, FIG. 9)", insert --,--.

Col. 9, line 1, after "receiver", delete ","; after "(at 210, FIG. 9)", insert --,--.

Col. 9, line 57, after "interval", insert --.--.

Col. 9, line 58, after "'2'", insert --,--.

Col. 12, line 5, "indentification" should be --identification--.

Col. 12, line 33, "indentification" should be --identification--.

Col. 12, line 49, "indentification" should be --identification--.

Signed and Sealed this

Twenty-seventh Day of February, 1996

Attest:

BRUCE LEHMAN

Attesting Officer    Commissioner of Patents and Trademarks